(12) United States Patent
Hoshi et al.

(10) Patent No.: US 8,267,228 B2
(45) Date of Patent: Sep. 18, 2012

(54) BRAKE DISC HAVING CORRUGATED OUTER PERIPHERY

(75) Inventors: Yoshio Hoshi, Takatsuki (JP); Tsuyoshi Nakatsuji, Takatsuki (JP); Tooru Fujii, Kyotanabe (JP); Kazuya Ookubo, Kyotanabe (JP); Kiyotaka Obunai, Kyotanabe (JP)

(73) Assignee: Sunstar Engineering Inc., Takatsuki-Shi (JP)

( * ) Notice: Subject to any disclaimer, the term of this patent is extended or adjusted under 35 U.S.C. 154(b) by 499 days.

(21) Appl. No.: 12/523,405

(22) PCT Filed: Jan. 18, 2008

(86) PCT No.: PCT/JP2008/050571
§ 371 (c)(1),
(2), (4) Date: Jul. 16, 2009

(87) PCT Pub. No.: WO2008/090809
PCT Pub. Date: Jul. 31, 2008

(65) Prior Publication Data
US 2010/0044171 A1 Feb. 25, 2010

(30) Foreign Application Priority Data
Jan. 22, 2007 (JP) .................................. 2007-011189

(51) Int. Cl.
*B60T 1/06* (2006.01)
(52) U.S. Cl. ................................................. 188/218 XL

(58) Field of Classification Search ............ 188/218 XL, 188/264 A, 18 A, 264 AA, 71.6, 26, 58, 59
See application file for complete search history.

(56) References Cited

U.S. PATENT DOCUMENTS
7,762,379 B2 * 7/2010 Fujita et al. ............. 188/218 XL FOREIGN PATENT DOCUMENTS
| EP | 0 971 147 A2 | 1/2000 |
| JP | 2001-182764 A1 | 7/2001 |
| WO | WO 2004/042247 A1 | 5/2004 |

OTHER PUBLICATIONS
International Search Report for International Application No. PCT/JP2008/050571 dated Feb. 19, 2008.

\* cited by examiner

*Primary Examiner* — Melanie Torres Williams
(74) *Attorney, Agent, or Firm* — Kratz, Quintos & Hanson, LLP

(57) ABSTRACT

The present invention provides a brake disc having a corrugated outer periphery capable of effectively preventing brake judder. A brake disc having a corrugated outer periphery (1) comprising a hub disc (4) fixed to a wheel, a braking disc (3) coaxially disposed outside the hub disc (4), and a connection pin (5) connecting the hub disc (4) and the braking disc (3) with each other in a floating state, in which a plurality of outer peripheral recesses (7) are formed in an outer periphery of the braking disc (3) at a distance from one another in a circumferential direction to form the outer periphery into a corrugated shape, wherein depths (d) of the outer peripheral recesses (7) from an outer peripheral circle (C) of the braking disc (3) are set shallow. The depth (d) of the outer peripheral recesses (7) is set to 7 mm or less.

7 Claims, 16 Drawing Sheets

[Fig.1]
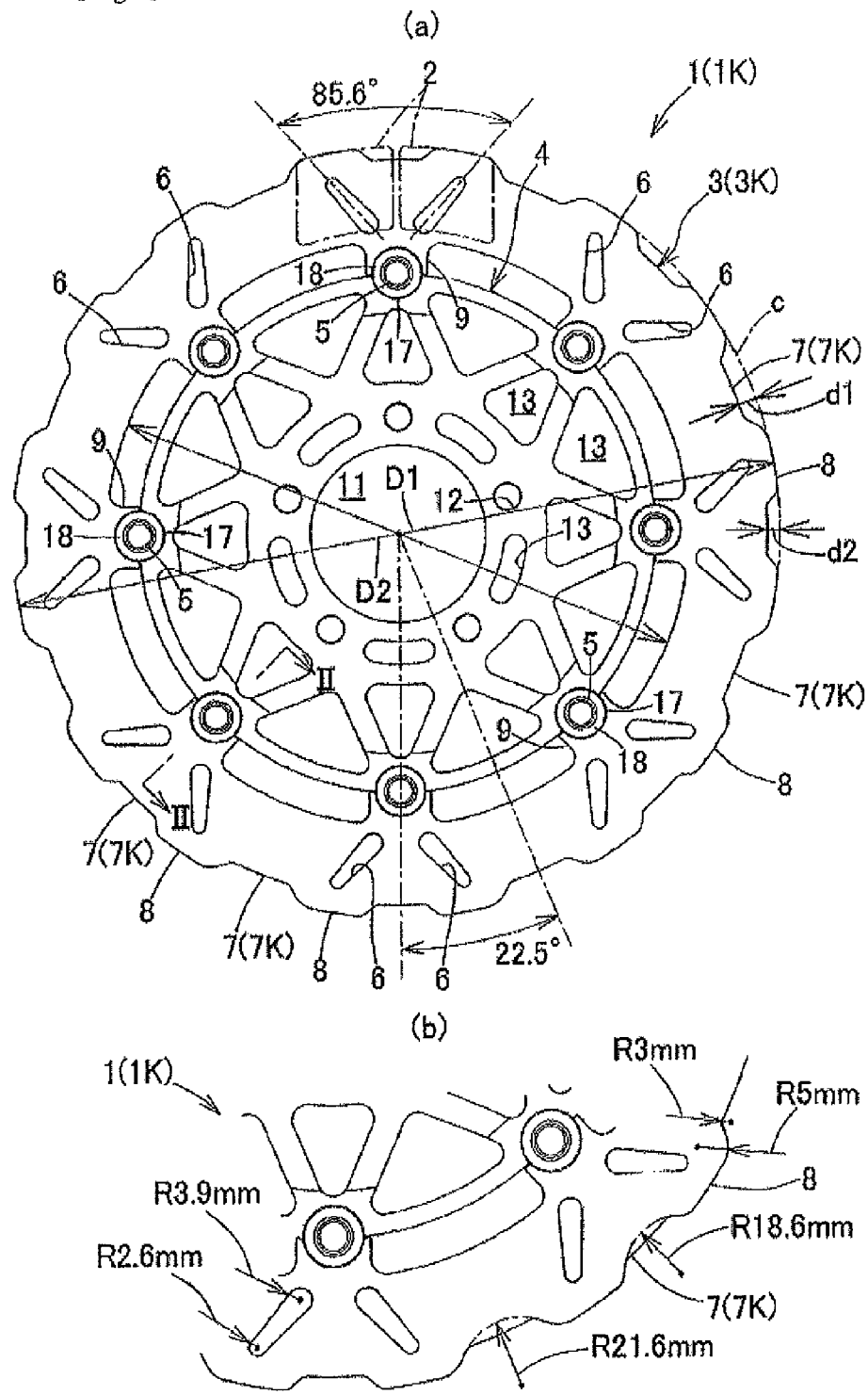

[Fig.2]
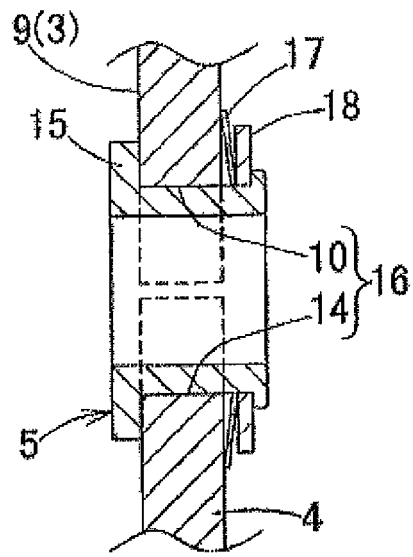
[Fig.3]
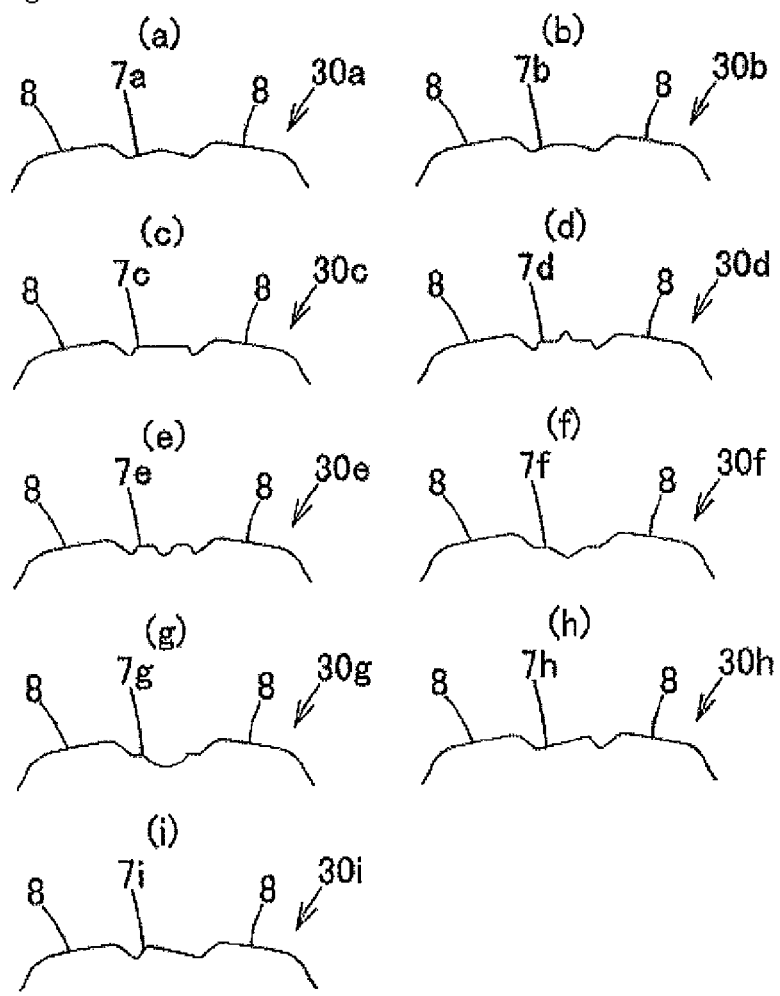

[Fig.4]
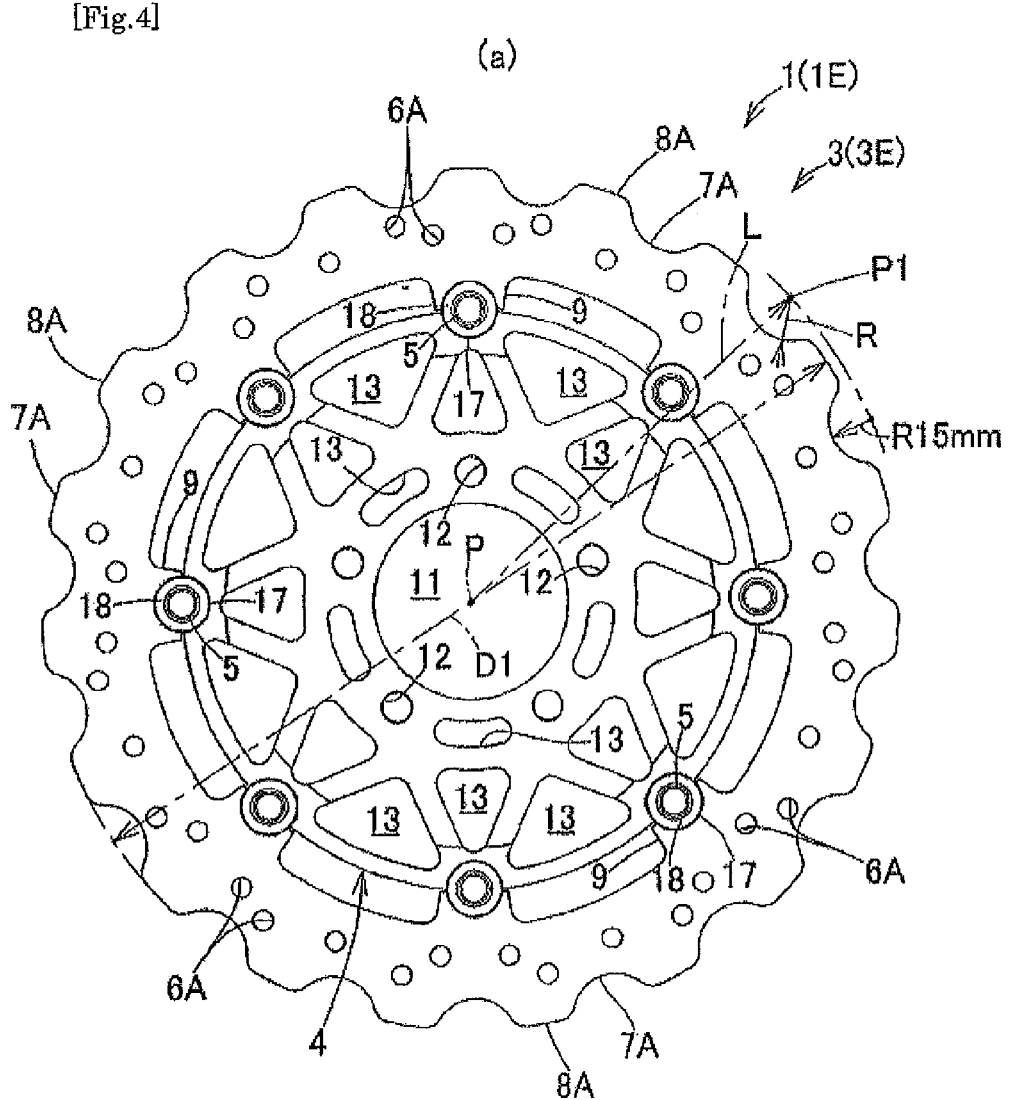
(a)
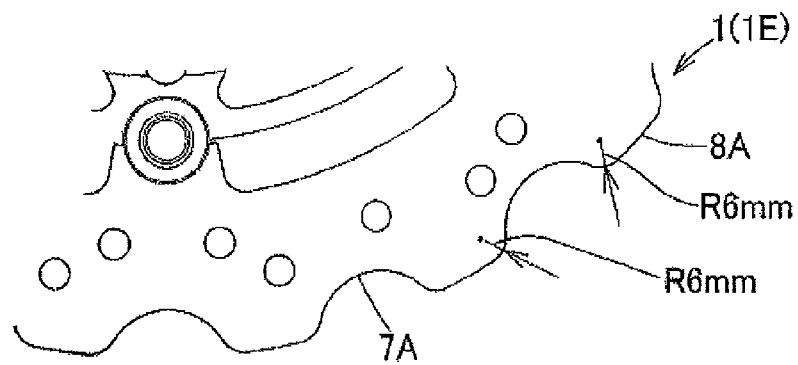
(b)

[Fig.5]
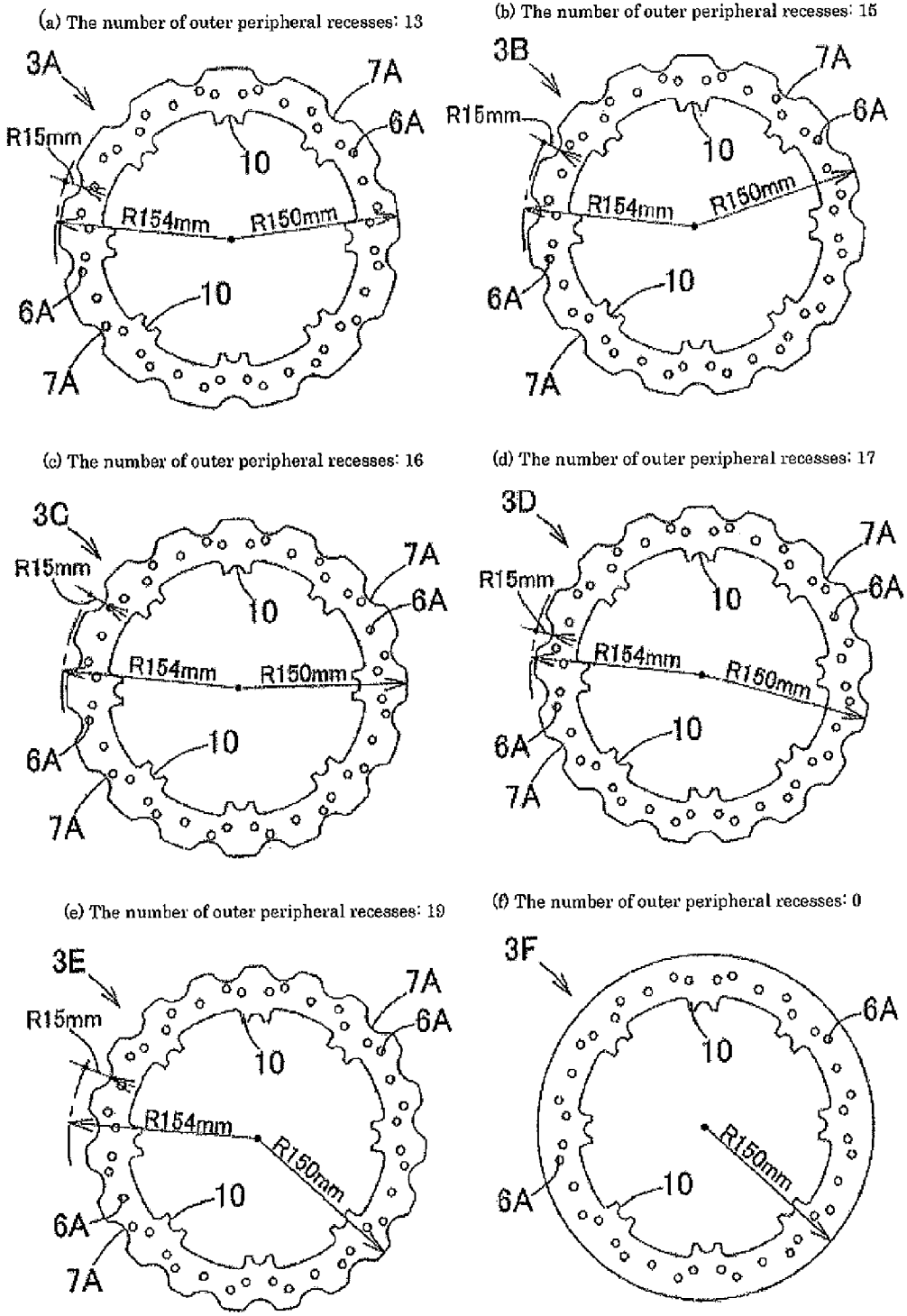

[Fig.6]
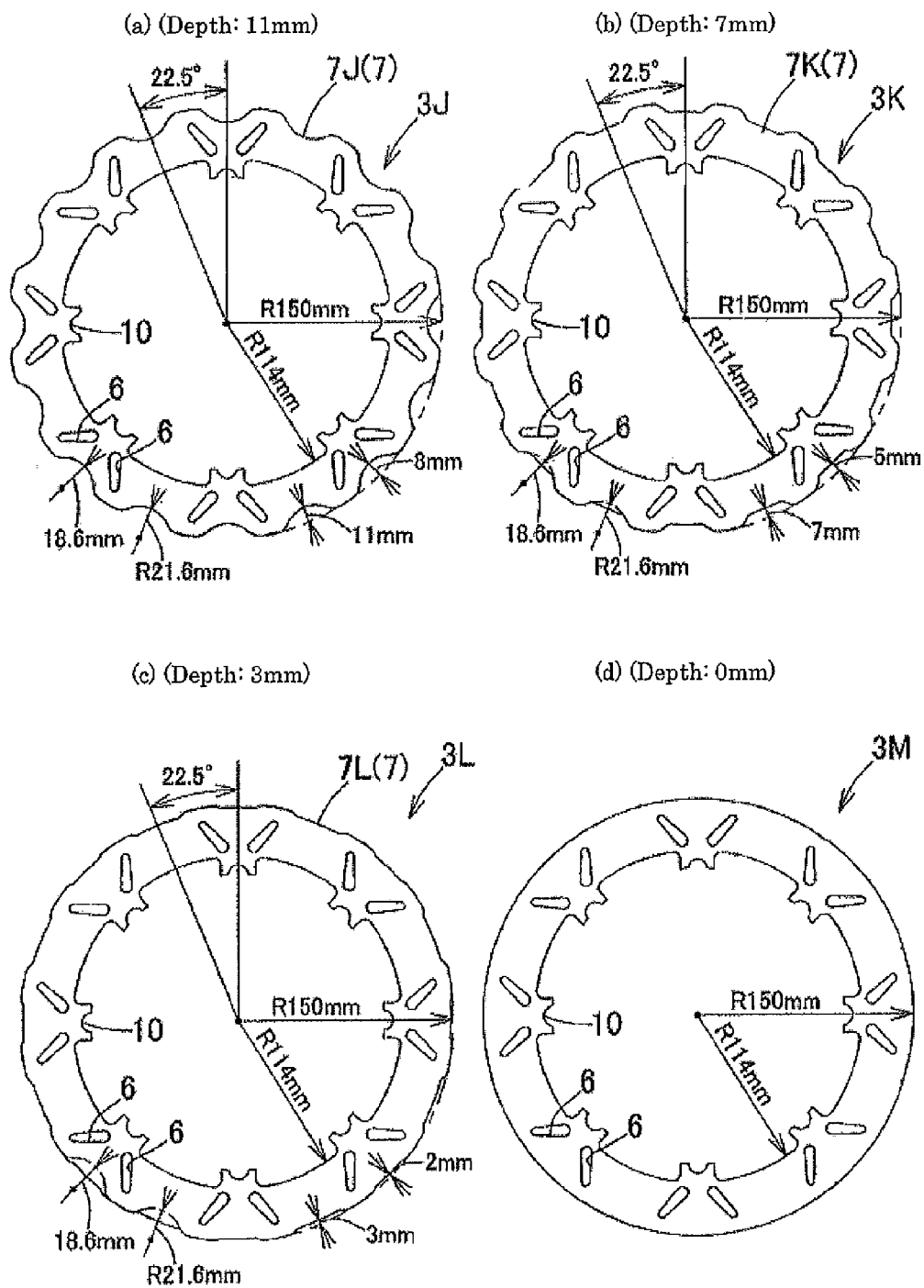

[Fig.7]
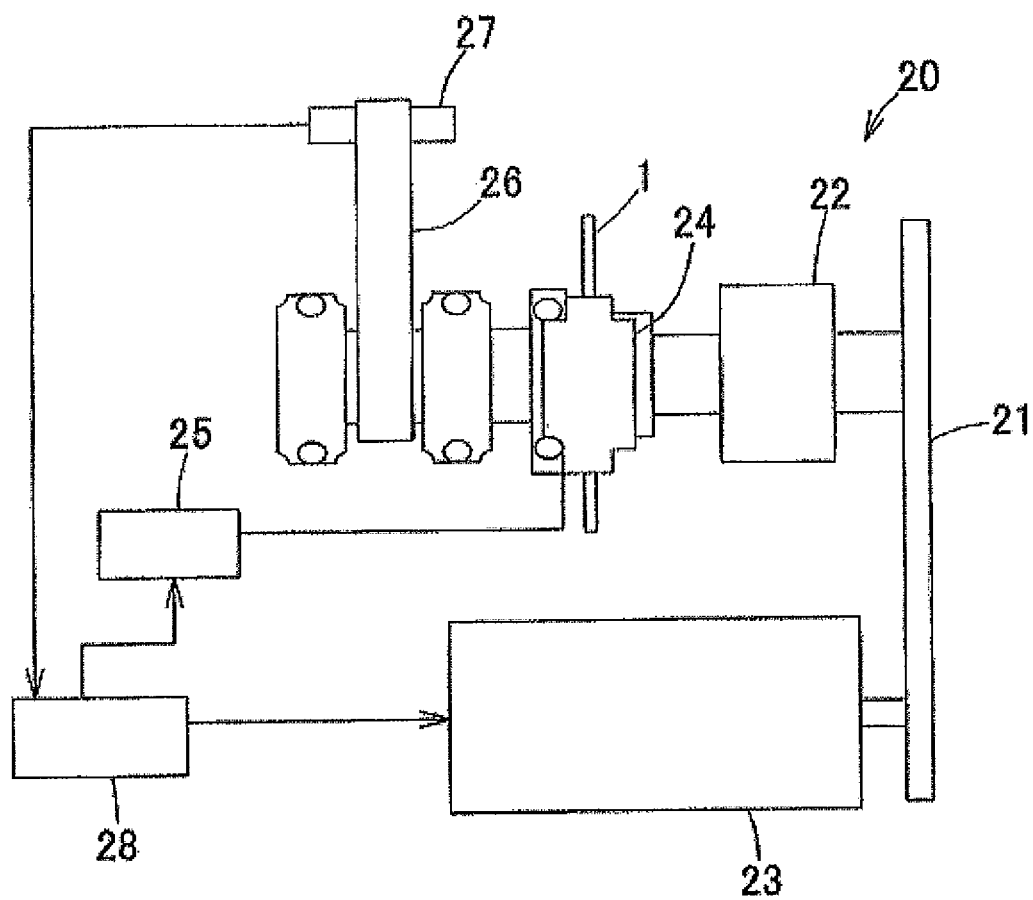

[Fig.8]
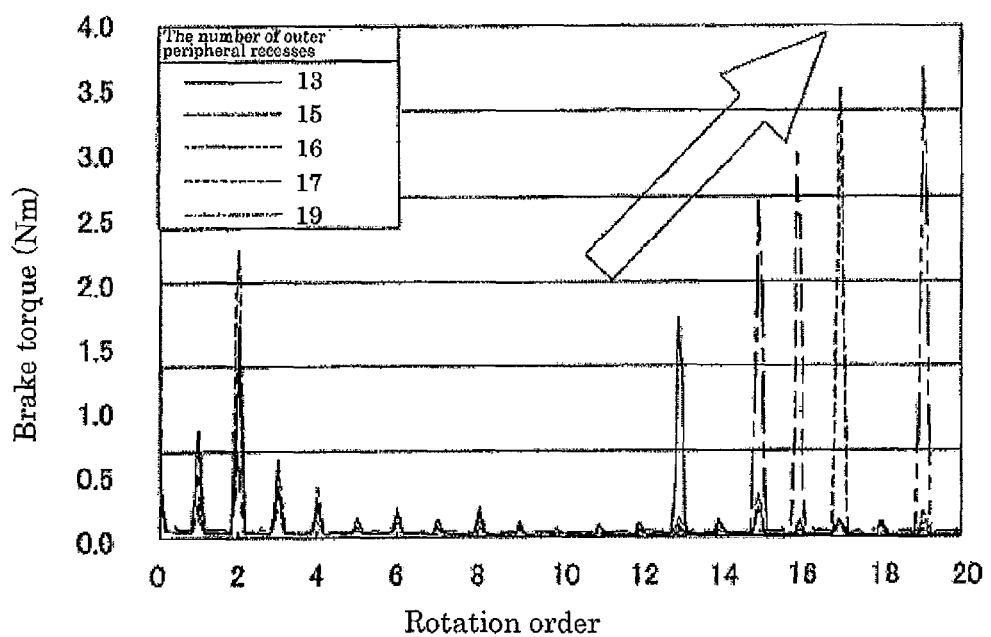

[Fig.9]
(a)
The number of outer peripheral recesses: 13
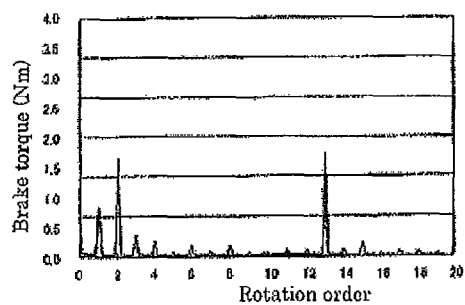
(b)
The number of outer peripheral recesses: 15
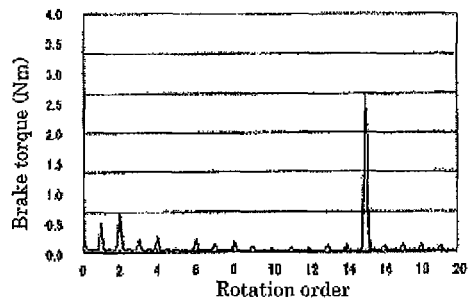
(c)
The number of outer peripheral recesses: 16
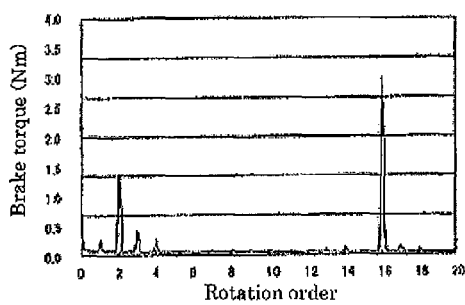
(d)
The number of outer peripheral recesses: 17
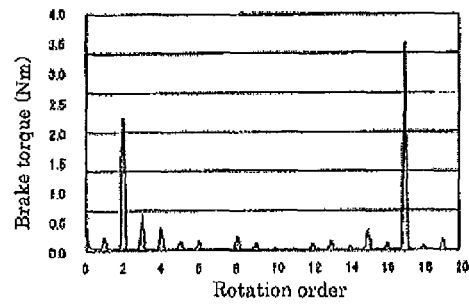
(e)
The number of outer peripheral recesses: 19
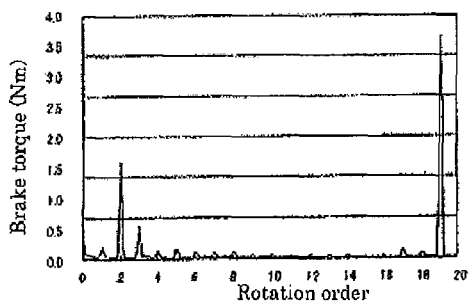

[Fig.10]
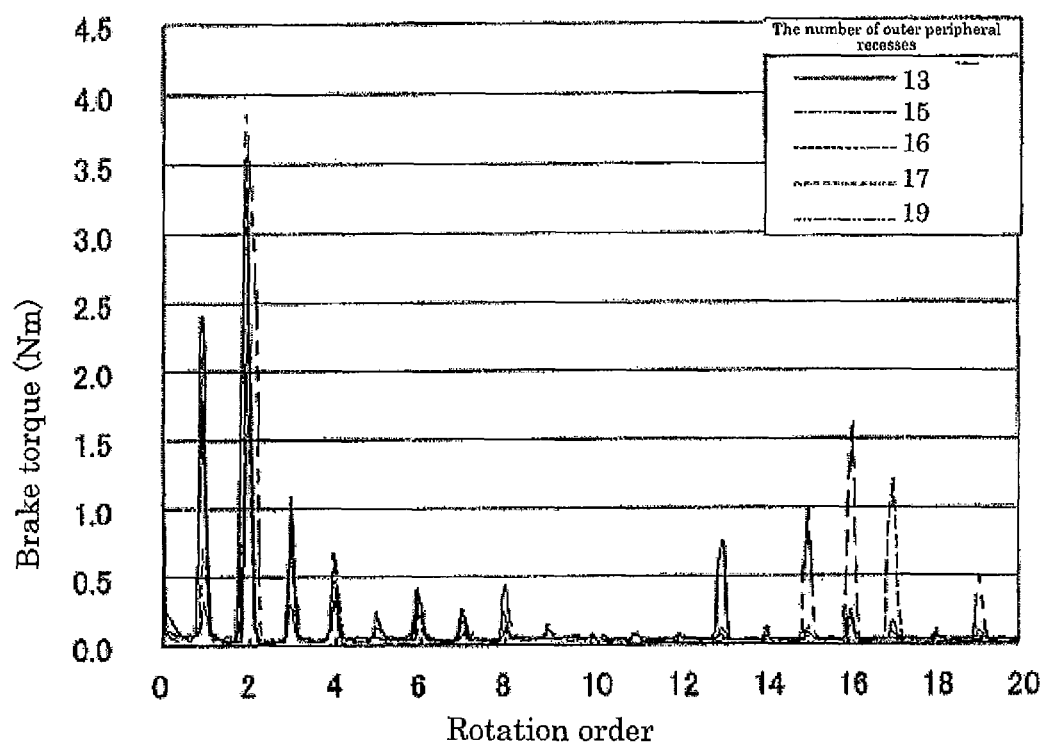

[Fig.11]
(a)
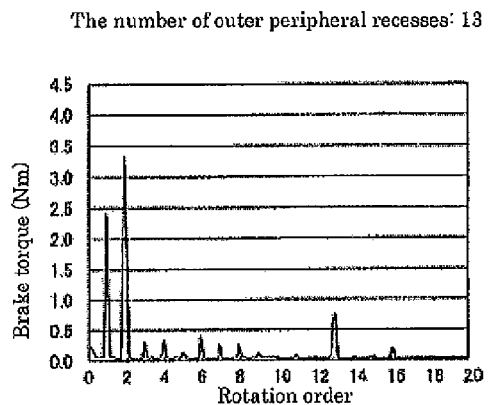
The number of outer peripheral recesses: 13
(b)
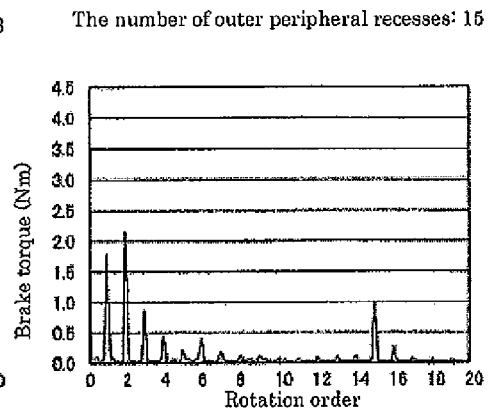
The number of outer peripheral recesses: 15
(c)
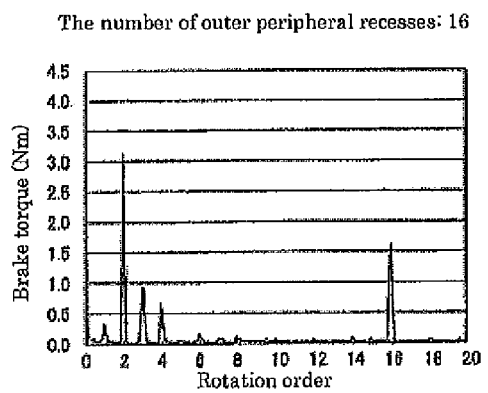
The number of outer peripheral recesses: 16
(d)
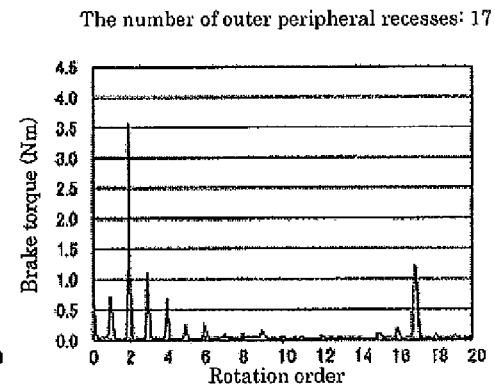
The number of outer peripheral recesses: 17
(e)
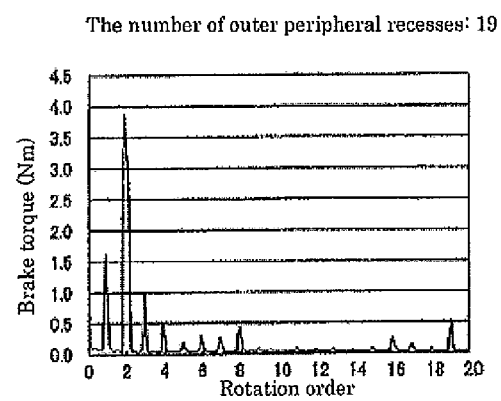
The number of outer peripheral recesses: 19

[Fig.12]
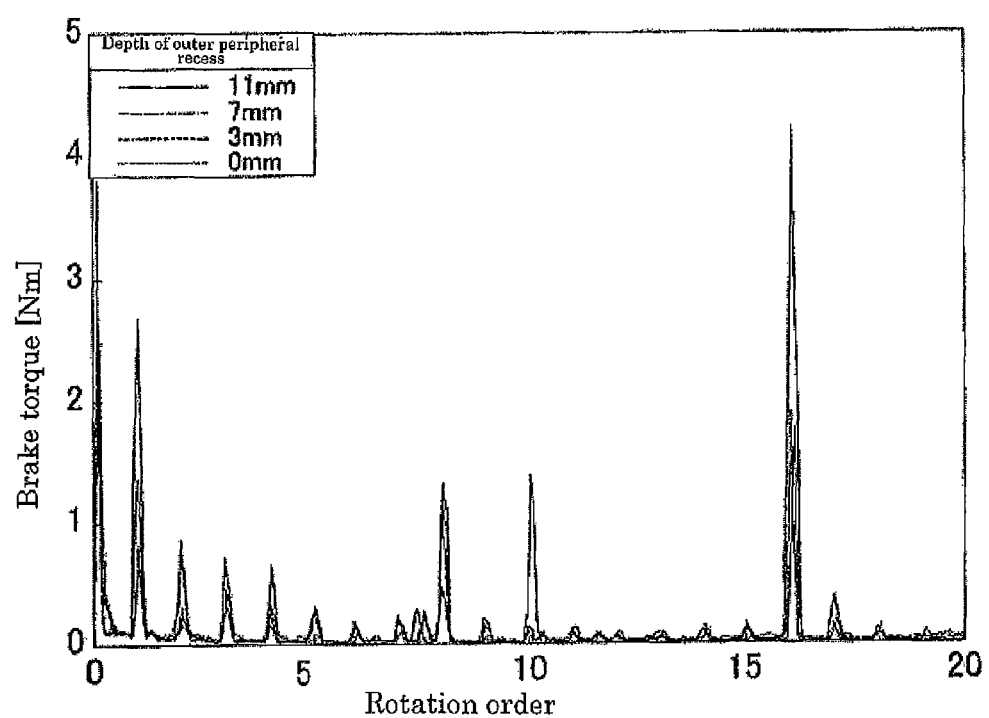

[Fig.13]
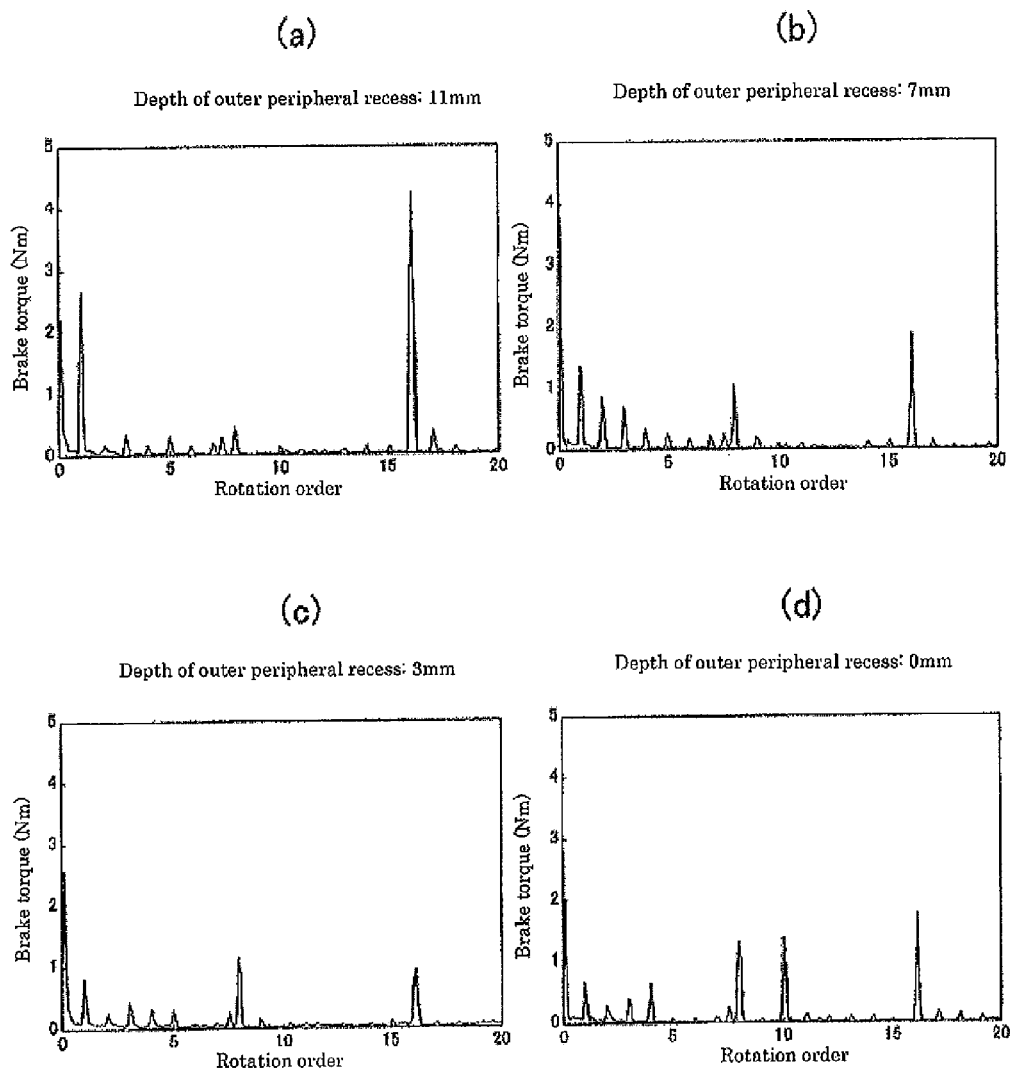

[Fig.14]
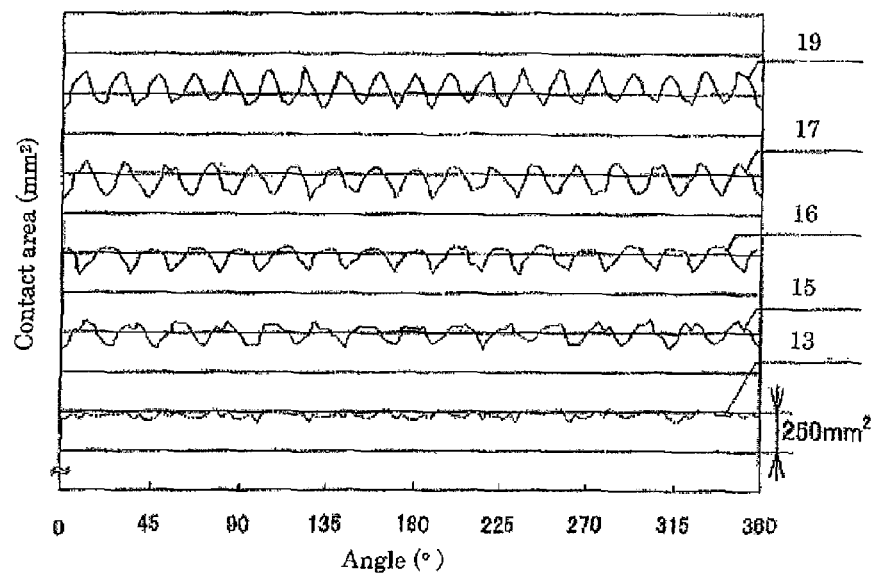
[Fig.15]
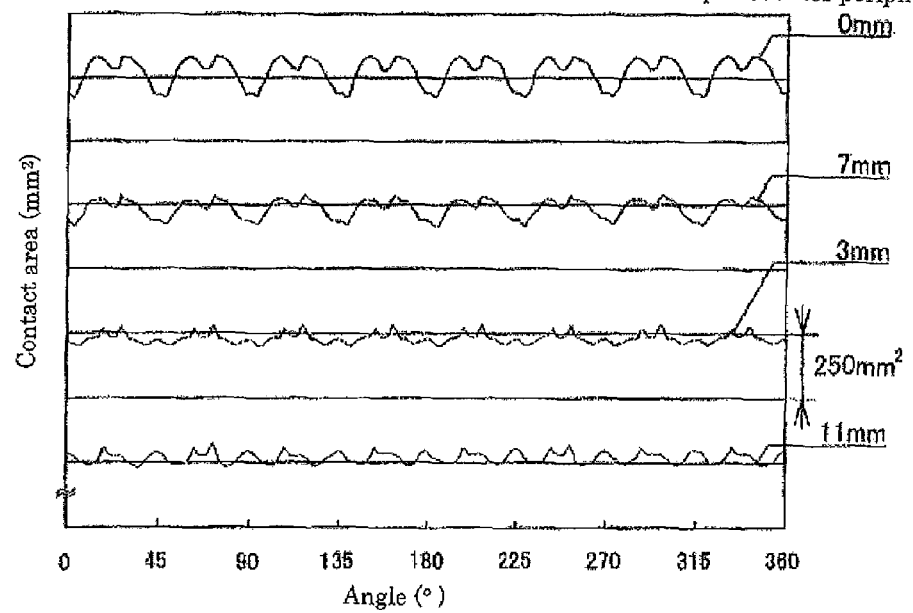

[Fig.16]
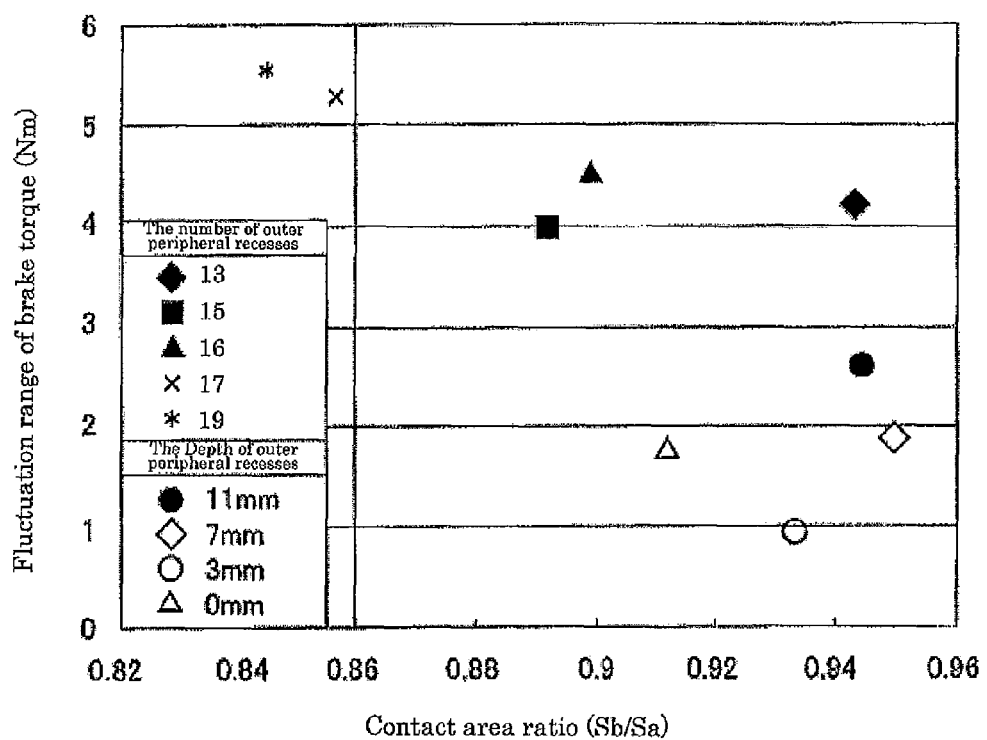

[Fig.17]
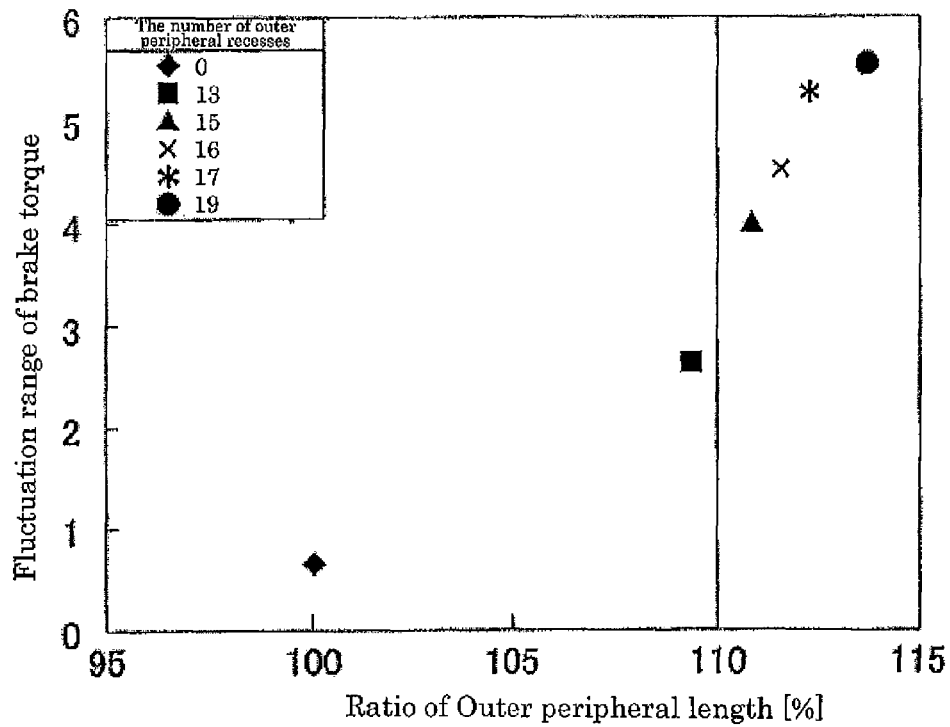
[Fig.18]
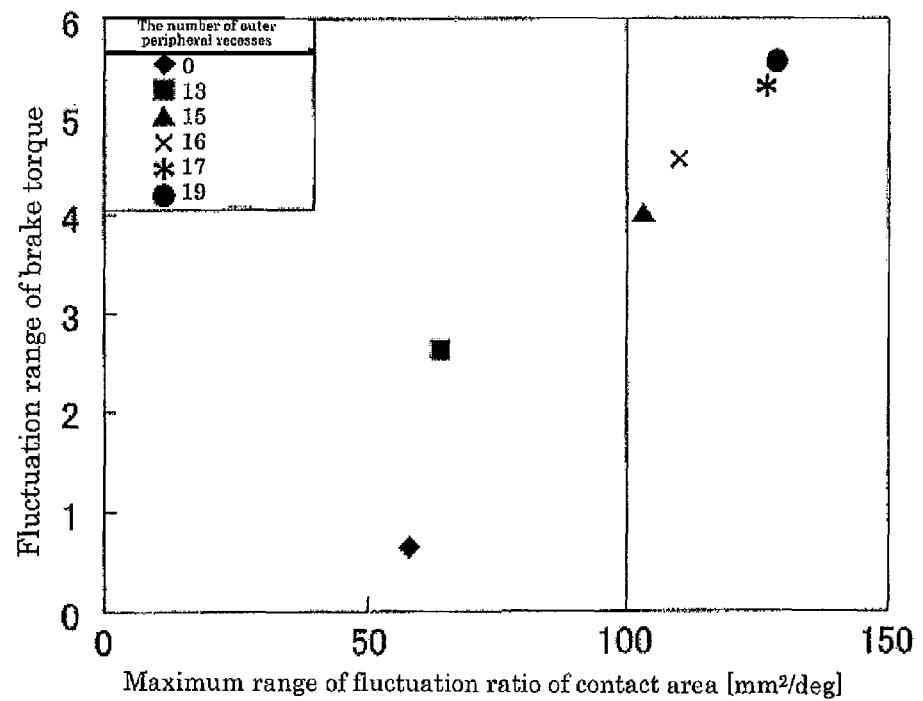

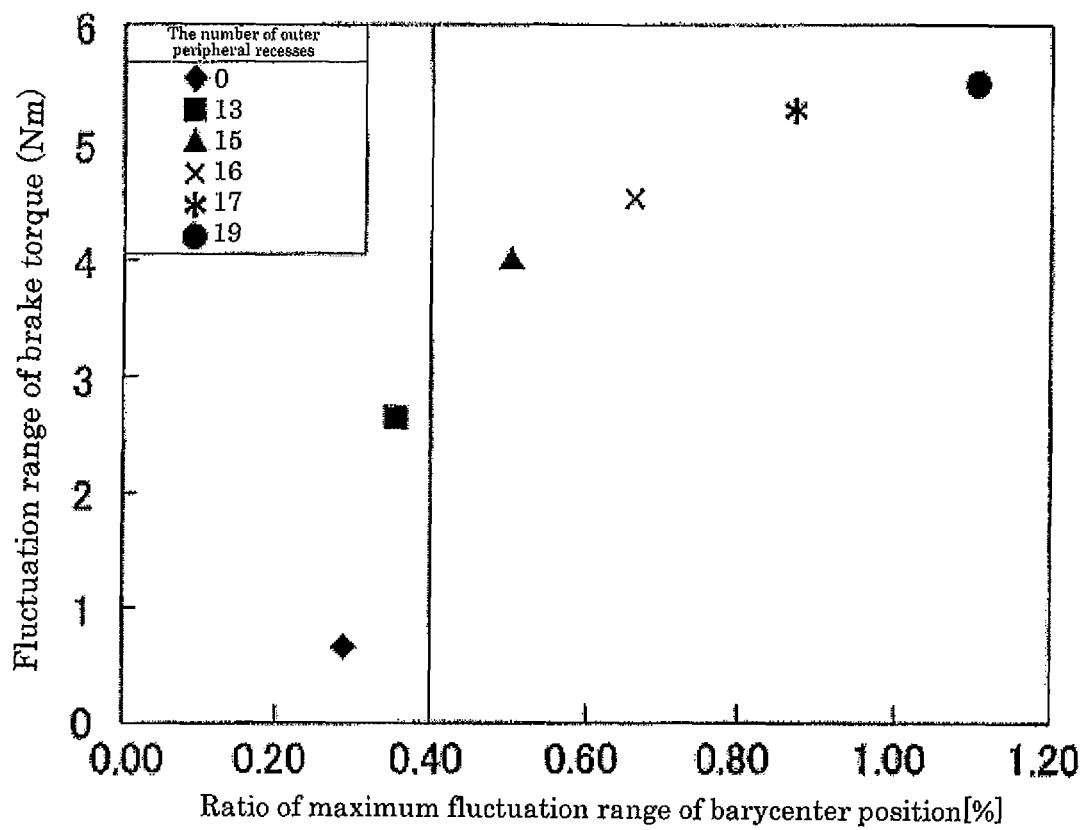
[Fig.19]

BRAKE DISC HAVING CORRUGATED OUTER PERIPHERY

BACKGROUND OF THE INVENTION

1. Field of the Invention

The present invention relates to a brake disc having a corrugated outer periphery suitable as a brake disc for a two-wheeled motor vehicle.

2. Description of the Background Art

As a brake disc for a two-wheeled motor vehicle, a floating brake disc widely becomes commercially practical. The floating brake disc includes a hub disc fixed to a wheel, a braking disc disposed on an outer side of the hub disc coaxially, and a connection pin that connects the hub disc and the braking disc in a floating manner. As such a floating brake disc, there are a brake disc having a circular outer periphery, and a brake disc having a corrugated outer periphery in which a plurality of recesses are formed in the outer periphery at a distances from one another in the circumferential direction. The brake disc having the corrugated outer periphery is light in weight and has excellent mud-drainage and excellent design and thus, it is on board of not only an off-road motorcycle but also an on-road motorcycle (e.g., see patent document 1).

In the meantime, as vibration at the time of braking operation of a disc brake device, brake judder in a low frequency region is known other than brake squeal in a high frequency region. The brake judder is abnormal vibration at the time of the braking operation, and a driver feels the abnormal vibration of a handle bar or a brake lever as the brake judder. If a poor driver encounters the brake judder for the first time, there is an adverse possibility that the driver erroneously operates the handle bar or the brake and thus, it is desired to reliably prevent the brake judder to enhance the safety of the vehicle.

It is known that the brake judder phenomenon in the brake disc having the circular outer periphery is caused by fluctuation in the brake torque and the brake liquid pressure due to the manufacturing precision of the brake disc such as the thickness precision of the brake disc and the flatness of the brake disc. Therefore, the brake disc having the corrugated outer periphery is also designed such that the manufacturing precision of the brake disc is enhanced to prevent the brake judder.

[Patent document 1] International Patent Publication No. 2004-042247

In the brake disc having the corrugated outer periphery, however, even if the manufacturing precision of the brake disc is enhanced in the same level as the brake disc having the circular outer periphery, the brake judder is generated in some cases. In such a case, it is a situation in which the design is changed by trial and error, e.g., sizes of various portions of the brake disc are changes and a brake disc in which a brake judder is not generated is produced. It is required to find a cause of the brake judder and to produce a brake disc that can reliably prevent the brake judder. As a result of the design made by trial and error, a floating brake disc in which the number of recesses formed in the outer periphery is 24, the number of connection pins is 7 and the number of mounting holes is 5, and these numbers are relative primes has become commercially practical.

SUMMARY OF THE INVENTION

It is an object of the invention to provide a brake disc having a corrugated outer periphery that can effectively prevent the brake judder.

A brake disc having a corrugated outer periphery according to the present invention comprises a hub disc fixed to a wheel, a braking disc coaxially disposed outside the hub disc, and a connection pin connecting the hub disc and the braking disc with each other in a floating state. A plurality of outer peripheral recesses are formed in an outer periphery of the braking disc at a distance from one another in a circumferential direction to form the outer periphery into a corrugated shape, and depths of the outer peripheral recesses from an outer peripheral circle of the braking disc are set shallow.

If the depth of the outer peripheral recess is set shallower than the existing brake disc having the corrugated outer periphery in this manner, fluctuation in brake torque at the time of the braking operation can be reduced and brake judder can effectively be prevented. A mechanism that can reduce the fluctuation in brake torque by reducing the depth of the outer peripheral recess can be estimated as follows. That is, a pair of brake pads are brought into contact with both surfaces of the braking disc under pressure at the time of braking operation, and a braking force is obtained by friction resistance between the brake pads and the braking disc. It is estimated that if the outer periphery of the brake pad is opposed to the outer peripheral recess, the braking disc can not receive the outer periphery of the brake pad, the compression elastic deformation of the friction material of the brake pad is partially released, the friction material falls into the outer peripheral recess, and when the outer periphery of the brake pad is opposed to the outer periphery projection between the adjacent outer peripheral recesses, the friction material that is in the outer peripheral recess is again compressed elastic deformed, its resistance pushes back both the brake pads, releasing and re-deformation of the compression elastic deformation of the friction material of the brake pad are repeated, and the fluctuation in brake torque is generated. In the invention, the depth of the outer peripheral recess is set shallow, the resistance at the time of re-deformation of compression elastic deformation of the brake pad is set small, and the fluctuation in brake torque is reduced, thereby preventing brake judder.

It is preferable that the depth of the outer peripheral recesses is set to 7 mm or less, and more preferably, 2 mm or greater and 6 mm or less. If the depth of the outer peripheral recess exceeds 7 mm, the fluctuation in brake torque becomes great and brake judder is easily generated and thus, it is preferable that the depth of the outer peripheral recess is set to 7 mm or less. If it is set to 2 mm or greater and 6 mm or less, this is preferable because the weight can be reduced by providing the outer peripheral recess, the mud-drainage performance is enhanced, heat radiation is enhanced, design is enhanced, and the brake judder can effectively be reduced.

It is preferable that the number of outer peripheral recesses, the number of mounting holes to the wheel and the number of floating pins are set to a relation of relatively prime. With this structure, if the number of outer peripheral recesses, the number of mounting holes to the wheel and the number of floating pins are set to relatively prime, it is possible to adjust the vibration of the brake disc at the time of braking operation and to effectively prevent brake judder.

It is preferable that the number of outer peripheral recesses is set to 3 to 23, the number of mounting holes to the wheel is set to 3 to 7 and the number of floating pins is set to 5 to 12. By setting the numbers of the outer peripheral recesses, the mounting holes and the floating pins in this manner, it is possible to realize the brake disc having the corrugated outer periphery that can prevent the brake judder.

It is preferable that an area ratio Sb/Sa of a maximum value Sa and a minimum value Sb of a contact area between the braking disc and a brake pad that comes into contact with the braking disc under pressure is set to 0.86 or higher. If the area ratio of the maximum value and the minimum value of the contact area between the braking disc and the brake pad is increased, the fluctuation in brake torque is increased and the brake judder is easily generated. Therefore, it is preferable that the area ratio Sb/Sa is set to 0.86 or higher. To reduce the brake judder, it is more preferable that the area ratio Sb/Sa of the maximum value Sa and the minimum value Sb is set to 0.90 or more and 1.0 or less.

The area ratio Sb/Sa is set to said range by adjusting one or more of the depth of the outer peripheral recess, an opening shape of the outer peripheral recess on the side of a braking surface, a length of the outer peripheral recess in the circumferential direction, disposed position of a through hole in the braking surface of the braking disc, an opening shape of the through hole on the side of the braking surface, the number of through holes, and an opening area of the through hole.

It is preferable that an outer peripheral length of the braking disc is set to 110% or less of an outer peripheral length of a braking disc of the same diameter having no outer peripheral recess. If the outer peripheral length of the braking disc is increased, the depth of the outer peripheral recess is increased, the number of outer peripheral recesses is increased and the brake judder is easily generated. Therefore, it is preferable that the outer peripheral length of the braking disc is set to 110% or less of the outer peripheral length of a braking disc of the same diameter having no outer peripheral recess.

It is preferable that a difference between a maximum rate of change Sva and a minimum rate of change Svb of the contact area between the braking disc and the brake pad that comes into contact with the braking disc under pressure at every set angle θ in a circumferential direction of the braking disc is defined as a rate of change maximum width (Sva-Svb) of the contact area, and the rate of change maximum width (Sva-Svb) of the contact area is set to 100 (mm$^2$/deg) or less. If the rate of change maximum width (Sva-Svb) of the contact area is increased, the depth of the outer peripheral recess is increased, the shape of the outer peripheral recess comes closer to a rectangular shape and brake judder is easily generated. Thus, it is preferable that the rate of change maximum width (Sva-Svb) is set to 100 (mm$^2$/deg) or less.

It is preferable that a difference between a maximum value Ga and a minimum value Gb of a distance cog (θ) between a barycenter position of a contact portion of the braking disc with respect to the brake pad and a center of the braking disc at every set angle θ in the circumferential direction of the braking disc is defined as a maximum fluctuation range (Ga-Gb) of the barycenter position, and the maximum fluctuation range (Ga-Gb) of the barycenter position is set to 0.4% or less of a radius of the braking disc. If the maximum fluctuation range (Ga-Gb) at the brake pad is increased, fluctuation in brake torque is increased and brake judder is easily generated. Thus, it is preferable that the maximum fluctuation range (Ga-Gb) of the barycenter position is set to 0.4% or less of the radius of the braking disc.

According to the brake disc having the corrugated outer periphery of this invention, the depth of the recess formed in the outer periphery is set shallower than that of the existing brake disc having the corrugated outer periphery. With such a simple structure, it is possible to effectively prevent the brake judder. Further, since it is possible to design a brake disc that can prevent the brake judder when the brake disc is newly designed, it is possible to remarkably enhance the productivity of the brake disc. The number of recesses formed in the outer periphery, the number of mounting holes with respect to the wheel and the number of floating pins are set to relatively primes, the area ratio Sb/Sa of the maximum value Sa and the minimum value Sb of the contact area of braking disc and the brake pad that is brought into contact with the braking disc under pressure is set to 0.86 or higher, the outer peripheral length of the braking disc is set to 110% or less of the outer peripheral length of a braking disc of the same diameter having no recess in the outer periphery, the rate of change maximum width (Sva-Svb) of the contact area between the braking disc and the brake pad is set to 100 (mm$^2$/deg) or less, and the maximum fluctuation range (Ga-Gb) of the barycenter position of the contact portion of the braking disc with respect to the brake pad is set to 0.4% or less of radius of the braking disc. If these configurations are arbitrarily combined with each other, it is possible to further effectively prevent the brake judder from being generated.

BRIEF DESCRIPTION OF THE DRAWINGS

FIG. 1(*a*) is a front view of a brake disc having a corrugated outer periphery in which a depth of a recess in an outer periphery is set to 7 mm;

FIG. 1(*b*) is an enlarged view around the recess in the outer periphery of the brake disc having the corrugated outer periphery;

FIG. 2 is a sectional view taken along the line II-II in FIG. 1;

FIG. 3 is a front view of a braking disc of another structure;

FIG. 4(*a*) is a front view of a brake disc having a corrugated outer periphery in which the number of recesses in the outer periphery is set to 19;

FIG. 4(*b*) is an enlarged view around the recesses in the outer periphery of the brake disc having the corrugated outer periphery;

FIGS. 5(*a*) to (*f*) are front views of the braking discs whose numbers of recesses in the outer periphery are different from each other and the braking test of which was carried out;

FIGS. 6(*a*) to (*d*) are front views of four braking discs whose depth of the recesses in the outer periphery is different from each other and the braking test of which was carried out;

FIG. 7 is a schematic diagram showing a structure of a bench test machine;

FIG. 8 is a graph in which a relation between the rotation order and the brake torque of first test discs is summarized in a case in which brake discs and brake pads that had been used for a given period were used;

FIG. 9(*a*) to (*e*) are graphs showing relations between the rotation order and the brake torque of respective first test discs of FIG. 8;

FIG. 10 is a graph in which a relation between the first test discs and the rotation order is summarized in a case in which a brake discs that had been used for a given period and new brake pads were used;

FIG. 11(*a*) to (*e*) are graphs showing relations between the rotation order and the brake torque of respective first test discs of FIG. 10;

FIG. 12 is a graph in which a relation between the rotation order and the brake torque of second test discs is summarized;

FIG. 13(*a*) to (*d*) are graphs showing relations between the rotation order and the brake torque of respective second test discs of FIG. 12;

FIG. 14 is a graph in which fluctuation in contact areas between respective braking discs and brake pads of the first test discs is analyzed by a 3D-CAD every three degrees of circumference;

FIG. 15 is a graph in which fluctuation in contact areas between respective braking discs and brake pads of the second test discs is analyzed by a 3D-CAD every three degrees of circumference;

FIG. 16 is an explanatory diagram showing a relation between a fluctuation range of a brake torque and a ratio of a maximum value and a minimum value of a contact area of the first and second test discs;

FIG. 17 is an explanatory diagram showing a relation between a ratio of an outer peripheral length of the first test discs and a fluctuation range of the brake torque;

FIG. 18 is an explanatory diagram showing a relation between a fluctuation range of the brake torque and the rate of change maximum width of the contact area of the first test discs with respect to the brake pads; and FIG. 19 is an explanatory diagram showing a relation between a fluctuation range of the brake torque and a ratio of the maximum fluctuation range of the barycenter position in a contact portion of the first test discs with respect to the brake pads and a radius of the braking disc.

DESCRIPTION OF THE PREFERRED EMBODIMENTS

An embodiment of the present invention will be explained with reference to the drawings below. First, a basic structure of a brake disc 1 will be explained. As shown in FIGS. 1 and 2, the brake disc 1 is a floating brake disc, and includes a braking disc 3 on the side of an outer periphery opposed to a brake pad 2 of a brake caliper, a hub disc 4 on the side of a central portion fixed to a wheel, and a connection pin 5 that connects both the discs 3 and 4 to each other. The brake disc 1 supports both the discs in a floating manner using the connection pin 5.

The braking disc 3 has excellent heat resistance and wear resistance, and is made of stainless steel plate or carbon steel plate. The braking disc 3 is subjected to thermal processing such as high frequency quenching to enhance the wear resistance of front and back surfaces of the braking disc 3. A plurality of through holes 6 are formed in an intermediate portion of the braking disc 3 in its radial direction in a specific order to enhance and stabilize the braking performance, to enhance the cooling performance and water recovery performance and to reduce the weight. A plurality of outer periphery recesses 7 and a plurality of outer periphery projections 8 are alternately formed on the outer periphery of the braking disc 3 at distances from one another in the circumferential direction to reduce the weight, to enhance the mud-drainage performance, to enhance the heat-radiation performance and to enhance the design. The outer periphery recesses 7 and the outer periphery projections 8 form the corrugated shape. A plurality of connecting portions 9 project inward from the inner periphery of the braking disc 3 at a distance in the circumferential direction. A semi-circular outer side connecting recess 10 is formed in each connecting portion 9. The outer side connecting recess 10 opens inward. An outer diameter D1 of the braking disc 3 is 300 mm, an inner diameter D2 of the braking disc 3 excluding the connecting portion 9 is 228 mm, and a thickness of the braking disc 3 is 6 mm.

The brake pads 2 of the brake disc (not shown) are disposed on both sides of the braking disc 3. The brake pads 2 sandwich the braking disc 3 therebetween so that a braking force is applied to the brake disc 1. The outer peripheral edge of the brake pad 2 is disposed along the outer peripheral edge of the braking disc 3, the inner peripheral edge of the brake pad 2 is disposed slightly outside from the inner peripheral edge of the braking disc 3, and the entire surface of the brake pad 2 slides on a braking surface of the braking disc 3.

The hub disc 4 is made of aluminum alloy having relatively high coefficient of thermal expansion to reduce the weight. The hub disc 4 is formed at its central portion with an opening 11 through which an axle is inserted. A plurality of mounting holes 12 are formed near the opening 11 at constant distances from one another in the circumferential direction for fixing the hub disc 4 to the wheel (not shown). A plurality of weight-reduction holes 13 are formed in an intermediate portion of the hub disc 4 in the radial direction. A semi-circular inner connection recess 14 opening is outward formed in the outer periphery of the hub disc 4 in correspondence with the outer side connecting recess 10 of the braking disc 3.

The connection pin 5 is a hollow cylindrical member made of stainless steel or carbon steel having excellent wear resistance, and an annular flange 15 is formed on one end of the connection pin 5. The braking disc 3 and the hub disc 4 are connected to each other in a floating manner by inserting the connection pin 5 into a connection hole 16 formed by combining the outer side connecting recess 10 and the inner connection recess 14 with each other, and by fitting a disc spring 17 and a washer 18 over the connection pin 5, and swaging the other end of the connection pin 5.

The first distinctive feature of the invention is that in the brake disc 1 having the above-described basic structure, the depth of the outer periphery recess 7 from an outer peripheral circle C of the braking disc 3 is set shallower than the corrugated braking disc. More specifically, the depth d of the outer periphery recess 7 is set to not more than 7 mm, preferably 2 mm or more and 6 mm or less.

If the depth d of the outer periphery recess 7 exceeds 7 mm, the fluctuation in the brake torque is increased at the time of the braking operation, the brake judder is prone to be generated and thus, it is preferable that the depth is set to 7 mm or less and more preferably 6 mm or less. It is preferable to set the depth d of the outer periphery recess 7 to 2 mm or more to reduce the weight, to enhance the mud-drainage performance, to enhance the heat-radiation performance and to enhance the design.

The second distinctive structure of the invention is that the number of outer periphery recesses 7, the number of mounting holes 12 with respect to the vehicle body, and the number of connection pins 5 are set to relatively primes.

If the number of outer periphery recesses 7, the number of mounting holes 12 with respect to the vehicle body, and the number of connection pins 5 are set to relatively primes, the number can freely be set, but if the number of the outer periphery recesses 7 is less than 3, the weight can not be reduced sufficiently, and if the number of outer periphery recesses 7 exceeds 23, the brake judder is generated easily and thus, the number of outer periphery recesses 7 is set to in a range of 3 to 23. The number of mounting holes 12 can be set to 3 to 7 while taking the mounting strength with respect to a wheel into account, and the number of connection pins 5 can be set to 5 to 12 so that the connection strength between the braking disc 3 and the hub disc 4 can sufficiently be secured.

The third distinctive structure of the invention is that an area ratio Sb/Sa of the maximum value Sa and the minimum value Sb of the contact area between the braking disc 3 and the brake pad 2 that comes into contact with the braking disc 3 under pressure is set to 0.86 or higher, and more preferably the area ratio Sb/Sa of the maximum value Sa and the minimum value Sb is set to 0.90 or higher and 1.0 or lower.

The fourth distinctive structure of the invention is that the outer peripheral length of the braking disc 3 is set to 110% or less of the outer peripheral length of the braking disc of the same diameter having no outer periphery recess 7.

The fifth distinctive structure of the invention is that a difference between the maximum rate of change Sva and the minimum rate of change Svb of the contact area between the braking disc 3 and the brake pad 2 that comes into contact with the braking disc 3 under pressure at every set angle θ in the circumferential direction of the braking disc 3 is set to a rate of change maximum width (Sva-Svb) of the contact area, and the rate of change maximum width (Sva-Svb) of the contact area is set to 100 (mm²/deg) or less.

The sixth distinctive structure of the invention is that a difference between a maximum value Ga and a minimum value Gb of a distance cog (θ) between a center of the braking disc 3 and a barycenter position of a contact portion of the braking disc 3 with respect to the brake pad 2 at every set angle θ in the circumferential direction of the braking disc 3 is set to a maximum fluctuation range (Ga-Gb) of the barycenter position, and the maximum fluctuation range (Ga-Gb) of the barycenter position is set to 0.4% or less of the radius of the braking disc 3.

The area ratio Sb/Sa, the ratio of the outer peripheral length of the braking disc 3, the rate of change maximum width (Sva-Svb) of the contact area, and the ratio of the maximum fluctuation range (Ga-Gb) of the barycenter position to the radius of the braking disc 3 can be set to the above-described ranges by adjusting one or more of the depth of the outer periphery recess 7, the opening shape of the outer periphery recess 7 on the side of the brake surface, the length of the outer periphery recess 7 in the circumferential direction, the disposed position of the through holes 6 in the brake surface of the braking disc 3, the opening shape of the through holes 6 on the side of the brake surface, the number of through holes 6, and the opening area of the through holes 6. For example, it is possible to form recesses of various shapes or the outer peripheral recesses 7a to 7i formed with projections in the bottom surfaces of the outer periphery recesses 7 in accordance with shapes or sizes of the through holes 6 like the braking discs 30a to 30i shown in FIGS. 3(a) to (i), and to set the area ratio Sb/Sa to 0.86 or higher, preferably 0.90 or higher and 1.0 or lower, it is possible to set the outer peripheral length of the braking disc 3 to 110% or lower of the outer peripheral length of the braking disc of the same diameter having no outer periphery recess 7, it is possible to set the rate of change maximum width (Sva-Svb) of the contact area to 100 (mm²/deg) or less, and it is possible to set the maximum fluctuation range (Ga-Gb) of the barycenter position to 0.4% or less of the radius of the braking disc 3.

The brake disc 1 can have the six distinctive structures independently, or can have any combination thereof. When the structures are combined freely, synergistic reduction effect of the brake judder can be expected.

Next, a braking test carried out for finding a structure of the brake disc that can reduce the brake judder will be explained.

The brake judder phenomenon can be measured as fluctuation in brake torque or fluctuation in liquid pressure. Therefore, the following brake discs 1 were manufactured and the braking test was carried out and the brake torque was measured.

(First Test Disc)

To clarify the influence exerted on fluctuation of brake torque by the number of outer peripheral recesses (the number of corrugations), a plurality of kinds of first test discs having different numbers of the outer peripheral recesses were produced. As shown in FIGS. 4 and 5, in the first test disc, the structures of the outer periphery recesses 7 and the through holes 6 in the braking disc 3 of the brake disc 1 shown in FIG. 1 are partially changed, and the other structure is the same as that of the brake disc 1. More specifically, as the braking disc, it was made of martensite stainless steel for brake disc (SUS410DB), the outer diameter D1 was 300 mm, the thickness was 5 mm, and 40 round through holes 6A (five each) having diameter of 7 mm were formed instead of the through hole 6 in positions corresponding to the connection pins 5 symmetrically with respect to rotation. Five kinds of braking discs 3A to 3E having 13, 15, 16, 17 and 19 outer periphery recesses 7A instead of the outer periphery recesses 7 were produced. The outer peripheral recess 7A is arc having a radius R of 15 mm, and has a length L from the center P of the brake disc 1 to the center P1 of the arc was 154 mm. The outer peripheral recesses 7A were formed in the outer periphery at equal distances from one another in the circumferential direction. To clarify the influence caused by the outer periphery recesses 7A, a braking disc 3F having no outer peripheral recesses 7A was manufactured. The six kinds of braking discs 3A to 3F were connected to a hub disk 4 formed with five mounting holes 12 through eight connection pins 5 in a floating manner, and six kinds of first test discs 1A to 1F were manufactured. FIG. 4 shows the first test disc 1E on which a braking disc 3E is assembled. The braking disc 3E has 19 outer periphery recesses 7A on its outer periphery at equal distances from one another in the circumferential direction. In the other first test discs 1A to 1D and 1F, the braking discs 3A to 3D whose disposition pitches of the outer periphery recesses 7A were only different from each other and the braking disc 3F from which the outer periphery recesses 7A were omitted were assembled, and details thereof were omitted from the drawings.

(Second Test Disc)

To clarify the influence exerted on the fluctuation in brake torque by the depth of the outer peripheral recess, a plurality of second test discs having different depths of the outer periphery recesses 7 were manufactured. More specifically, as shown in FIGS. 1 and 6, the braking disc 3 was made of martensite stainless steel for brake disc (SUS410DB), the outer diameter was 300 mm, the thickness was 5 mm, and thin and long two through holes 6 were formed symmetrically with respect to rotation in correspondence with the connection pins 5. The through holes 6 have substantially chevron shape spreading toward the outer periphery. A braking disc 3J in which 16 outer peripheral recesses (called outer peripheral recesses having depth of 11 mm) having radii of 18.6 mm and 21.6 mm from a position of a radius of 160.6 mm of the braking disc 3 and having depths of 8 mm and 11 mm from the outer peripheral circle as the outer peripheral recesses 7 were formed such that 8 outer peripheral recesses 7J and 8 outer periphery recess 7J were alternately formed at equal distances from one another in the circumferential direction, a braking disc 3K in which 16 outer peripheral recesses (called outer peripheral recesses having depth of 7 mm) having depths d of 5 mm and 7 mm from the outer peripheral circle while remaining a bottom of the outer peripheral recesses 7J were formed such that 8 outer peripheral recesses 7K and 8 outer periphery recess 7K were alternately formed at equal distances from one another in the circumferential direction, a braking disc 3L in which 16 outer peripheral recesses (called outer peripheral recesses having depth of 3 mm) having depths of 2 mm and 3 mm from the outer peripheral circle while remaining a bottom of the outer peripheral recesses 7J were formed such that 8 outer peripheral recesses 7L and 8 outer periphery recess 7L were alternately formed at equal distances from one another in the circumferential direction, and a braking disc 3M having outer periphery recesses 7 having depth of 0 mm, i.e., having no outer periphery recesses 7 were manufactured. These four kinds of braking discs 3J to 3M were connected to the hub discs 4 formed with five mounting holes 12 through the eight connection pins 5 in the floating manner, and the four kinds of second test discs 1J to 1M were manufactured. FIG. 1 shows the second test disc 1K in which the depth of the outer periphery recesses 7 was set to 7 mm and the braking disc 3K was assembled. Concerning other second test discs 1J, 1L and 1M, the braking discs 3J, 3L and 3M whose depths of the outer periphery recesses 7 were only different from each other and details thereof were omitted from the drawings.

(Braking Test Machine)

A bench test machine 20 shown in FIG. 7 was used as the test machine. The bench test machine 20 includes an AC motor 23 that rotates a brake disc 1 through a belt 21 and a coupler 22, an inverter (not shown) for controlling the number of revolutions of the AC motor 23, opposed four-pot radial mount caliper 24 for super sport for applying the braking force to the test disc 1, an air-hydro booster 25 for controlling the brake liquid pressure for the caliper 24, a load cell 27 that measures the brake torque generated at the time of the braking operation through an arm 26 that is coaxially mounted on the caliper 24, and control means 28 for controlling the AC motor 23 and the air-hydro booster 25. The braking test machine was assembled such that the inverter controls the AC motor 23 to control the number of revolutions of the test disc 1, the air-hydro booster 25 controls the brake liquid pressure to the caliper 24, the brake pad 2 comprising a pair of sintered pads of the caliper 24 sandwiches the test disc 1, and thus the load cell 27 can measure the brake torque at that moment.

(Brake Test Condition)

In this test, the number of revolutions corresponding to a predetermined vehicle speed is given to the test disc 1 and then, dragging braking is carried out while applying the predetermined brake liquid pressure, thereby measuring the brake torque steadily The vehicle speed was set to 20 km/h and the brake liquid pressure was set to 1.0 MPa. After the dragging braking was carried out for six seconds, the test disc 1 was allowed to idle for 60 seconds to cool the braking portion, and a cooling condition was set such that the disc temperature was always at 120° or less so that the test disc 1 was not thermally deformed.

Under the above-described braking test condition, the brake test was carried out for the first test discs 1A to 1E whose numbers of outer peripheral recesses 7A (the number of corrugations) were different from each other. Concerning the measuring result of the brake torque, FFT analysis was carried out, and the rotation order ratio was analyzed. A result thereof is shown in FIGS. 8 to 11. Graphs shown in FIGS. 8 and 9 are graphs when the first test discs 1A to 1E whose brake test had been carried out 100 times or more, and the brake pad 2 whose brake test had been carried out 100 times or more were used. Graphs shown in FIGS. 10 and 11 are graphs when the first test discs 1A to 1E whose brake test had been carried out 100 times or more, and a new brake pad 2 were used. FIG. 8 is a graph in which graphs in FIGS. 9(a) to (e) are summarized, and FIG. 10 is a graph in which graphs in FIGS. 11(a) to (e) are summarized.

From FIGS. 8 to 11, the brake torque shows peaks in orders corresponding to the number of corrugations of the first test discs 1A to 1E. A cause of peak generated in the primary order is the thickness and distortion. Variation of the thicknesses and distortion of a brake disc that was not formed with the outer peripheral recesses and a brake disc that was formed with the outer peripheral recesses were measured using a three-dimension measuring device, and the rotation order proportion analysis was carried out for the thickness and the distortion. Since peak existed only in the primary order, it could be estimated that the cause of generation of peak in the primary order was thickness and distortion in FIGS. 8 to 11.

When the first test discs 1A to 1E and the brake pad 2 had slid with each other sufficiently, there was a tendency that as the number of outer periphery recesses 7A was increased, the brake torque of the order corresponding to the number of outer peripheral recesses 7A was increased as shown in FIGS. 8 and 9.

When the first test discs 1A to 1E and the brake pad 2 had not slid with each other sufficiently, as shown in FIGS. 10 and 11, the brake discs 1B and 1C respectively having 15 and 16 outer peripheral recesses 7A became high, and the brake discs 1A, 1D and 1E respectively having 13, 17 and 19 outer peripheral recesses 7A became low. It is conceived that in the first test discs 1A to 1E, vibrations caused by not only the number of outer periphery recesses 7A but also the number of mounting holes 12 and the number of connection pins 5 are superposed on each other. In the case of the first test discs 1A to 1E, since the number of mounting holes 12 is five and the number of connection pins 5 is eight, the brake torque of the order corresponding to the number of outer periphery recesses 7A is supposed to become large when the number of outer periphery recesses 7A, the number of mounting holes 12 and the number of connection pins 5 do not become relatively prime, i.e., have a common divider, and the brake torque of the order corresponding to the number of outer periphery recesses 7A is supposed to become small when the number of outer periphery recesses 7A, the number of mounting holes 12 and the number of connection pins 5 become relatively prime.

From the above reasons, it is found that it is possible to suppress the generation of the brake judder by reducing the number of outer peripheral recesses, and during a period in which the brake disc and the brake pad have not slid on each other sufficiently, if the number of outer peripheral recesses, the number of mounting holes and the number of connection pins are set to relatively prime, the brake judder can be reduced. When the number of outer peripheral recesses is less than three, the weight can not be reduced sufficiently, and if the number of outer peripheral recesses exceeds 23, the brake judder is prone to be generated and thus, it is preferable that the number of outer peripheral recesses is set in a range of 3 to 23.

Next, under the above-described braking test condition, the braking test was carried out for the second test discs 1J to 1M whose depths of the outer periphery recesses 7 were different from each other. A result of the measurement of the brake torque was FFT analyzed and the rotation order ratio was analyzed. A result thereof is shown in FIGS. 12 and 13. FIG. 12 is a graph in which the graphs in FIGS. 13(a) to (d) are summarized.

From FIGS. 12 and 13, the depths of the outer periphery recesses 7 became shallower to 11 mm, 7 mm and 3 mm as the brake torque of the 16 order corresponding to the number of outer periphery recesses 7 became smaller, but when the depth was 0 mm, i.e., when the outer periphery recesses 7 were not formed, the brake torque had the same value as that when the depth was set to 7 mm. From this, it can be found that it is preferable that the depth of the outer periphery recess 7 is set to 7 mm or less, and more preferably, 2 mm or more and 6 mm or less. When the depth of the outer periphery recess 7 is 0 mm, the brake torque becomes greater It is estimated this is because that the brake torque of the 16 order is influenced not only by the number of outer periphery recesses 7 but also the number of the through holes 6 (the number is 16).

From the above reason, the mechanism of generation of brake judder in the brake disc having the corrugated outer periphery can be estimated as follows. That is, when the brake pad reaches the outer peripheral recess, the outer periphery of the brake pad is not supported by the braking disc, the compression elastic deformation of a friction material is partially released and the friction material falls into the outer peripheral recess. When the brake disc further rotates and the brake pad passed through the outer periphery projection, the brake pad rides on the outer periphery projection and thus, the portion of the brake pad that has fallen again causes the compression elastic deformation, and its resistance pushes back the brake pad. It is estimated that by repeating the releasing of the compression elastic deformation of the brake pad and re-deformation (fall and ride of the brake pad), the fluctuation in brake torque is generated. In the braking test using the second test discs 1J to 1M whose depths of the outer peripheral recesses are different from each other, the brake torque of the 16 order became smaller as the depth of the outer periphery recess 7 became shallower. This can be explained by the same mechanism. That is, if the depth of the outer periphery recess 7 is shallow, the area of the outer periphery recess 7 becomes smaller, and the falling amount of the brake pad 2 when it reaches the outer periphery recess 7 becomes small. Therefore, it can be conceived that the resistance received by the brake pad 2 when it rides on the outer periphery projection 8 becomes smaller, and the fluctuation in brake torque becomes smaller.

Next, to check the influence of the contact area between the braking disc 3 and the brake pad 2 exerted on the fluctuation in brake torque, contact areas of the braking discs 3A to 3E, and 3J to 3M with respect to the brake pad 2 were obtained using 3D-CAD every three degrees in the circumferential direction. A result thereof is shown in FIGS. 14 and 15.

From FIG. 14, it can be estimated that as the number of outer peripheral recesses (number of corrugations) is increased, the maximum fluctuation range of the maximum value and the minimum value of the contact area becomes greater and the brake judder is prone to be generated. From FIG. 15, it can be conceived that concerning the depth of the outer periphery recess 7, the maximum fluctuation range of the contact area becomes greater and the fluctuation of the brake torque is increased even if the depth is 0 mm. FIG. 16 shows a relation between the fluctuation range of the brake torque and the area ratio Sb/Sa between the maximum value Sa and the minimum value Sb of the contact area. It can be found that the area ratio Sb/Sa is preferably 0.86 or higher, and more preferably 0.90 or higher and 1.0 or lower.

Next, to check the influence of the outer peripheral length of the braking disc 3 exerted on the fluctuation of the brake torque, ratios of the outer peripheral lengths of the braking discs 3A to 3E when the outer peripheral length of the braking disc 3F of the same diameter having no outer periphery recess 7 was defined as a reference were obtained. A result thereof is shown in FIG. 17.

From FIG. 17, it can be found that as the ratio of the outer peripheral length is increased, the number of outer periphery recesses 7 (the member of corrugations) is increased, the fluctuation range of the brake torque is increased and the brake judder is generated easily. It is found that to suppress the fluctuation range of the brake torque to 3 (Nm) or less and to restrain the generation of the brake judder, it is necessary to set the ratio of the outer peripheral length to 110% or less.

Next, to check the influence of the rate of change dS/dθ of the contact area S between the braking disc 3 and the brake pad 2 at every set angle θ in the circumferential direction of the braking disc exerted on the fluctuation of the brake torque, the rate of change dS/dθ of the contact area S at every set angle θ=0.5° in the circumferential direction of the braking disc was obtained for the braking discs 3A to 3E using the following equation (1), and a difference between the maximum rate of change Sva and the minimum rate of change Svb was obtained as a rate of change maximum width (Sva-Svb) of the contact area. A result thereof is shown in FIG. 18.

[Equation 1]

From FIG. 18, it can be found that as the rate of change maximum width (Sva-Svb) of the contact area is increased, the number of outer periphery recesses 7 (the number of corrugations) is increased, the fluctuation range of the brake torque is increased, and brake judder is prone to be generated. It can be found that to suppress the fluctuation range of the brake torque to 3 (Nm) or less and to suppress generation of the brake judder, it is necessary to set the rate of change maximum width (Sva-Svb) of the contact area to 100 (mm$^2$/deg) or less.

Next, to check the influence of fluctuation in barycenter position of the contact portion of the braking disc 3 with respect to the brake pad 2 at every set angle θ in the circumferential direction of the braking disc 3 exerted on the fluctuation in brake torque, a distance cog (θ) between the barycenter position of the contact portion and the center of the braking disc 3 at every set angle θ=0.5° in the circumferential direction of the braking disc 3 is obtained for the braking discs 3A to 3E using the following equation (2), a difference between the maximum value Ga and the minimum value Gb was defined as the maximum fluctuation range (Ga-Gb) of the barycenter position of the contact portion, and a ratio of the maximum fluctuation range (Ga-Gb) of the barycenter position to the radius of the braking disc 3 was obtained. A result thereof is shown in FIG. 19. The distance cog (θ) between the barycenter position of the contact portion and the center of the braking disc 3 was obtained by dividing a primary moment of the pad contact portion by the contact area.

[Equation 2]

From FIG. 19, it is found that as the ratio of the maximum fluctuation range (Ga-Gb) at the barycenter position in the contact portion is increased, the number of outer periphery recesses 7 (the number of corrugations) is increased, the fluctuation range of the brake torque is increased, and brake judder is prone to be generated. It is found that to suppress the fluctuation range of the brake torque to 3 (Nm) or less and to suppress the generation of the brake judder, it is necessary to set the ratio of the maximum fluctuation range (Ga-Gb) at the barycenter position to 0.4% or less.

[Equation 1]

$$\frac{dS}{d\theta} = \frac{S(\theta + 0.5) - S(\theta)}{0.5} \quad (1)$$

[Equation 2]

$$\cog(\theta) = \frac{\iint S(r,\theta) \times r\, dr\, d\theta}{\iint S(r,\theta)\, dr\, d\theta} \quad (2)$$

What is claimed is:

1. A brake disc having a corrugated outer periphery comprising a hub disc fixed to a wheel, a braking disc coaxially disposed outside the hub disc, and a connection pin connecting the hub disc and the braking disc with each other in a floating state, in which a plurality of outer peripheral recesses are formed in an outer periphery of the braking disc at a distance from one another in a circumferential direction to form the outer periphery into a corrugated shape, wherein depths of the outer peripheral recesses from an outer peripheral circle of the braking disc are set to 2 mm or more and 7 mm or less, wherein the number of outer peripheral recesses, the number of mounting holes to the wheel and the number of connection pins are set to a relation of relatively prime, wherein the number of outer peripheral recesses is set to 3 to 23, the number of mounting holes to the wheel is set to 3 to 7 and the number of connection pins is set to 5 to 12.

2. The brake disc having the corrugated outer periphery according to claim 1, wherein an area ratio Sb/Sa of a maximum value Sa and a minimum value Sb of a contact area between the braking disc and a brake pad that comes into contact with the braking disc under pressure is set to 0.86 or higher.

3. The brake disc having the corrugated outer periphery according to claim 2, wherein the area ratio Sb/Sa of the maximum value Sa and the minimum value Sb is set to 0.90 or higher and 1.0 or lower.

4. The brake disc having the corrugated outer periphery according to claim 2, wherein the area ratio Sb/Sa is set to said range by adjusting one or more of the depth of the outer peripheral recess, an opening shape of the outer peripheral recess on the side of a braking surface, a length of the outer peripheral recess in the circumferential direction, disposed position of a through hole in the braking surface of the braking disc, an opening shape of the through hole on the side of the braking surface, the number of through holes, and an opening area of the through hole.

5. The brake disc having the corrugated outer periphery according to claim 1, wherein an outer peripheral length of the braking disc is set to 110% or less of an outer peripheral length of a braking disc of the same diameter having no outer peripheral recess.

6. The brake disc having the corrugated outer periphery according to claim 1, wherein a difference between a maximum rate of change Sva and a minimum rate of change Svb of the contact area between the braking disc and the brake pad that comes into contact with the braking disc under pressure at every set angle θ in a circumferential direction of the braking disc is defined as a rate of change maximum width (Sva-Svb) of the contact area, and the rate of change maximum width (Sva-Svb) of the contact area is set to 100 (mm$^2$/deg) or less.

7. The brake disc having the corrugated outer periphery according to claim 1, wherein a difference between a maximum value Ga and a minimum value Gb of a distance cog (θ) between a barycenter position of a contact portion of the braking disc with respect to the brake pad and a center of the braking disc at every set angle θ in the circumferential direction of the braking disc is defined as a maximum fluctuation range (Ga-Gb) at the barycenter position, and the maximum fluctuation range (Ga-Gb) at the barycenter position is set to 0.4% or less of a radius of the braking disc.

* * * * *